United States Patent [19]

Wang et al.

[11] Patent Number: 5,421,552
[45] Date of Patent: Jun. 6, 1995

[54] FOOT-OPERATED VALVE

[76] Inventors: Wen-Bin Wang, No. 312, Chung-Shan Rd., Taichung City; Fang-Hsiung Chang, No. 11, Lane 105, Tung-An St., Feng-Yuan City, both of

[21] Appl. No.: 305,829
[22] Filed: Sep. 14, 1994
[51] Int. Cl.⁶ .............................. F16K 31/44
[52] U.S. Cl. ..................... 251/230; 74/575; 222/179; 251/295; 251/322
[58] Field of Search ............ 4/271, 272, 273; 74/512, 575; 222/179; 251/230, 295, 321, 322, 323

[56] References Cited

U.S. PATENT DOCUMENTS

| | | | |
|---|---|---|---|
| 1,562,979 | 11/1925 | Muend | 251/295 |
| 1,779,064 | 10/1930 | Gohring | 251/295 |
| 2,042,278 | 5/1936 | Sloan | 251/295 |
| 2,839,264 | 6/1958 | Trubert | 251/295 |
| 3,220,695 | 11/1965 | Downey et al. | 251/230 |
| 3,333,815 | 8/1967 | Downey et al. | 251/230 |
| 4,116,216 | 9/1978 | Rosenberg | 251/230 |
| 4,221,238 | 9/1980 | Madsen | 251/230 |
| 4,344,457 | 8/1982 | Caroli | 251/230 |
| 4,456,222 | 6/1984 | Shen | 251/230 |
| 5,029,806 | 7/1991 | Huo-Lien et al. | 251/295 |

Primary Examiner—George L. Walton
Attorney, Agent, or Firm—Knobbe, Martens, Olson & Bear

[57] ABSTRACT

A foot-operated valve includes a valve set with a hollow seat and a push rod that extends movably and slidably into the hollow seat and that has a bottom end with a plug provided therearound. The push rod is biased to a first position, wherein the plug blocks normally a distal bottom end of a tubular sleeve that is secured in the hollow seat. When downward pressure is applied on the push rod to move the push rod to a second position, the plug ceases to block the bottom end of the tubular sleeve to permit communication between water outlet and inlet holes of the hollow seat. A control unit is secured to the hollow seat and includes a button retaining seat, a button and a rotary member. The control unit is operable to retain releasably the push rod in a depressed state to maintain communication between the water outlet and inlet holes even when the downward pressure applied on the push rod is extinguished.

6 Claims, 5 Drawing Sheets

FOOT-OPERATED VALVE

BACKGROUND OF THE INVENTION

1. Field of the Invention

The invention relates to a valve, more particularly to a foot-operated valve for faucets and the like.

2. Description of the Related Art

Presently, the control of water flow through most faucets installed in public places, such as in hospitals and public toilets, is usually accomplished by rotating a handle or by applying pressure on a lever. Thus, the risk of being infected with a disease is relatively high because of the need to operate the faucet by hand. In order to overcome this drawback, some establishments have installed faucets which incorporate a sensor to control water flow. However, such faucets can only provide a predetermined amount of water when in use and is incapable of satisfying the water needs of different people.

One of the applicants of the present invention has disclosed in co-pending U.S. patent appln. Ser. No. 08/199,885, filed on Feb. 22, 1994, a foot-operated valve which is convenient to use, which can minimize the risk of infection because it obviates the need for operating the same by hand, and which can be used to provide varying amounts of water to satisfy the needs of different people. Although this foot-operated valve provides numerous advantages over the conventional water flow control devices commonly installed in faucets, it is somewhat inconvenient to use because pressure must be applied on the foot-operated valve continuously to obtain a continuous flow of water.

The applicants of this invention disclosed in copending U.S. patent appln. Ser. No. 08/271,518, filed on Jul. 7, 1994, a foot-operated valve which permits the continuous flow of water without the need for applying pressure continuously thereto. This foot-operated valve comprises a housing, a support plate, a valve set, a retaining plate unit, an extension spring means and a switch assembly.

The housing has an open top, a closed bottom and a surrounding wall formed with a first set of water outlet and inlet holes. One of the water outlet and inlet holes is disposed at a level higher than the other one of the water outlet and inlet holes. The support plate is mounted on the open top of the housing and is formed with a first hole.

The valve set includes a hollow seat, a tubular sleeve, a push rod, and a compression spring. The hollow seat is secured in the housing below the support plate and has an upright tube portion with an open top and a closed bottom. The tube portion confines an interior and is formed with radially extending outlet and inlet pipe connectors aligned with the first set of water inlet and outlet holes and communicated with the interior of the tube portion. The tubular sleeve is secured to and extends into the tube portion. The sleeve confines an axial through-hole and is formed with a passage means to communicate the through-hole and the outlet pipe connector. The push rod extends sealingly and slidably through the tubular sleeve and into the tube portion of the hollow seat. The push rod has a top end which extends out of the open top of the housing via the first hole of the support plate and a bottom end which has a plug secured therearound. The push rod is formed with an annular peripheral groove immediately above the plug and a radial first retaining unit adjacent the top end. The compression spring is provided in the upright tube portion and is interposed between the closed bottom of the tube portion and the push rod to bias the push rod upwardly so that the plug closes normally a distal bottom end of the tubular sleeve. When pressure is applied on the top end of the push rod against action of the compression spring, the plug moves away from the distal bottom end of the tubular sleeve so as to permit water entering the inlet pipe connector to reach the outlet pipe connector via the interior of the tube portion, the annular peripheral groove of the push rod, and the through-hole and the passage means of the tubular sleeve.

The retaining plate unit is disposed below the support plate and includes an elongated plate which is supported movably by the support plate and which is movable in a lateral direction towards and away from the push rod of the valve set. The elongated plate has a rear end and a front end formed with a second retaining unit. The extension spring means biases the second retaining unit of the elongated plate toward the push rod of the valve set to enable the second retaining unit to engage the first retaining unit on the push rod when pressure is applied on the top end of the push rod. The switch assembly includes a switch means operable selectively so as to pull the elongated plate against action of the extension spring means in order to disengage the second retaining unit from the first retaining unit, thereby permitting the compression spring to bias the push rod so that the plug closes the distal bottom end of the tubular sleeve.

Although a continuous flow of water can be obtained without applying pressure continuously on the above mentioned foot-operated valve, it is noted that the foot-operated valve is somewhat large and relatively complicated in construction.

SUMMARY OF THE INVENTION

Therefore, the object of the present invention is to provide an improved foot-operated valve which permits the continuous flow of water without the need for applying pressure continuously thereto and which is compact and relatively simple in construction.

Accordingly, the foot-operated valve of the present invention comprises a valve set and a control unit.

The valve set includes a hollow seat, a tubular sleeve, a push rod and a compression spring. The hollow seat has an upright tube portion with an open top and a closed bottom. The tube portion is formed with a set of water outlet and inlet holes. One of the water outlet and inlet holes is disposed at a level higher that the other one of the water outlet and inlet holes. The tubular sleeve is secured to and extends into the tube portion. The tubular sleeve confines an axial through-hole and is formed with a passage means to communicate the through-hole and the water outlet hole. The push rod extends sealingly and slidably through the tubular sleeve. The push rod has a top end and a bottom end which extends into the tube portion and which has a plug secured therearound. The compression spring is provided in the tube portion and is interposed between the closed bottom of the tube portion and the push rod to bias the push rod upwardly to a first position, wherein the plug closes normally a distal bottom end of the tubular sleeve to prevent water flowing through the water inlet hole from reaching the water outlet hole. The push rod is movable to a second position, wherein the plug is spaced from the distal bottom end of the tubular sleeve to permit water from the water inlet hole to flow through the water outlet hole.

The control unit includes a button retaining seat, a button and a rotary member. The button retaining seat is secured to the hollow seat above the tube portion. The button retaining seat is formed as a ring-shaped member and has an inner wall surface which is formed with a retaining unit. The retaining unit includes a plurality of angularly spaced rib sets. Every two adjacent rib sets cooperatively define a guideway therebetween. Each of the rib sets includes first and second ribs which are arranged side-by-side and which extend in an axial direction of the button retaining seat. The first and second ribs have substantially equal lengths and inclined end surfaces which incline in the same direction. The button is formed as a hollow cylindrical member which extends movably in the button retaining seat and which has a closed top end portion that extends upwardly through the button retaining seat and an open lower end portion that is formed with a plurality of downwardly extending teeth and a plurality of radial outward first protrusions. Each of the first protrusions is disposed between two adjacent ones of the teeth and extends into a respective one of the guideways. The rotary member is formed as a hollow cylindrical member which extends movably into the open lower end portion of the button and which has a closed top and an open bottom that is formed with a plurality of radial outward second protrusions. The top end of the push rod extends into the open bottom of the rotary member.

Each of the second protrusions abuts one of the first protrusions when the push rod is in the first position. When pressure is applied on the button to move the push rod from the first position to the second position, the rotary member and the push rod move downwardly to cause the second protrusions of the rotary member to slide eventually along the inclined end surface of a respective one of the first ribs to retain the push rod in the second position.

When pressure is applied on the button to move the push rod from the second position to the first position, the teeth of the button push the second protrusions to enable the second protrusions to slide eventually past the inclined end surface of a respective one of the second ribs so as to abut once more with one of the first protrusions and permit the push rod to return to the first position.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
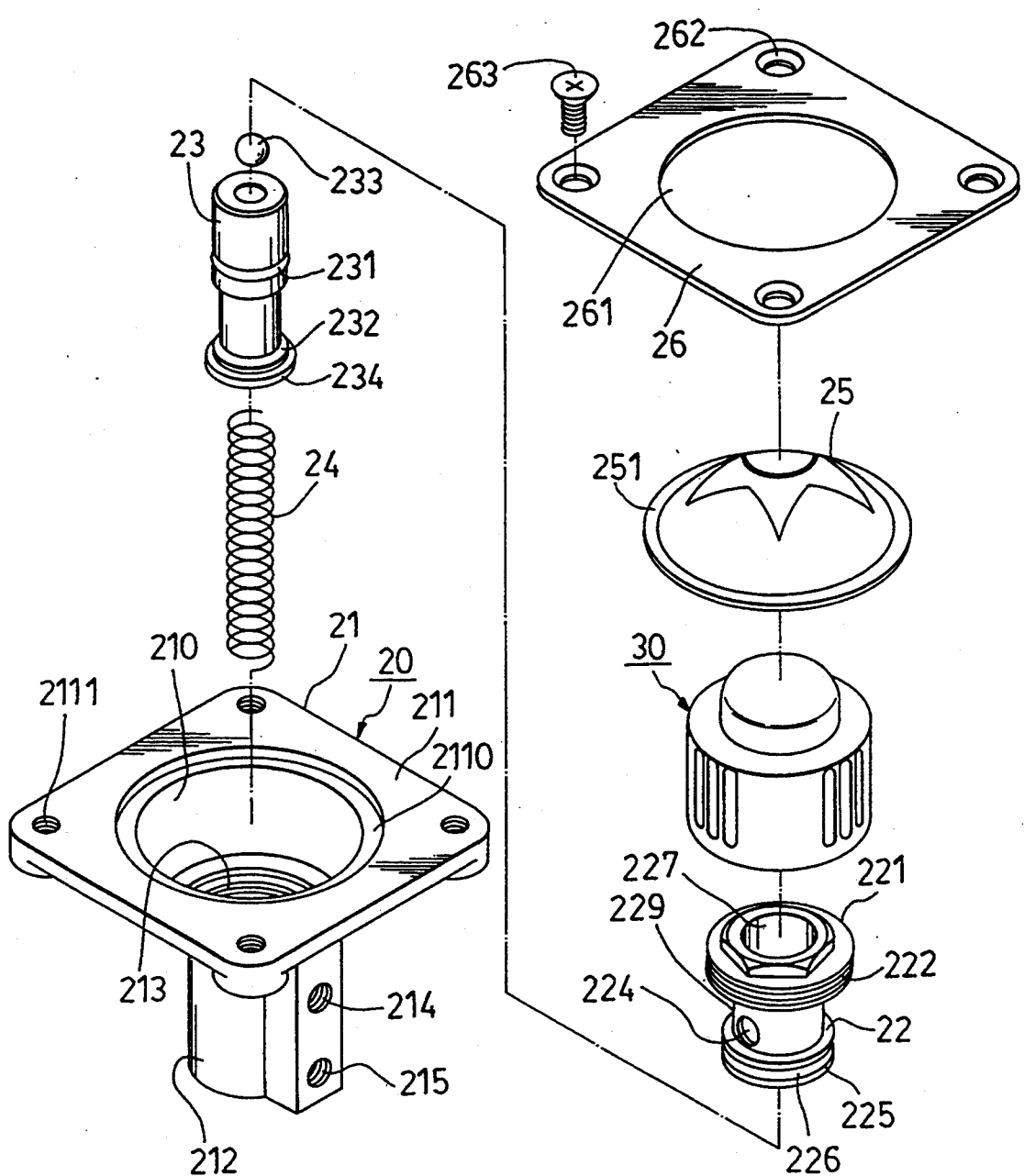
FIG. 1 is an exploded view of the preferred embodiment of a foot-operated valve according to the present invention.
Figure 2:
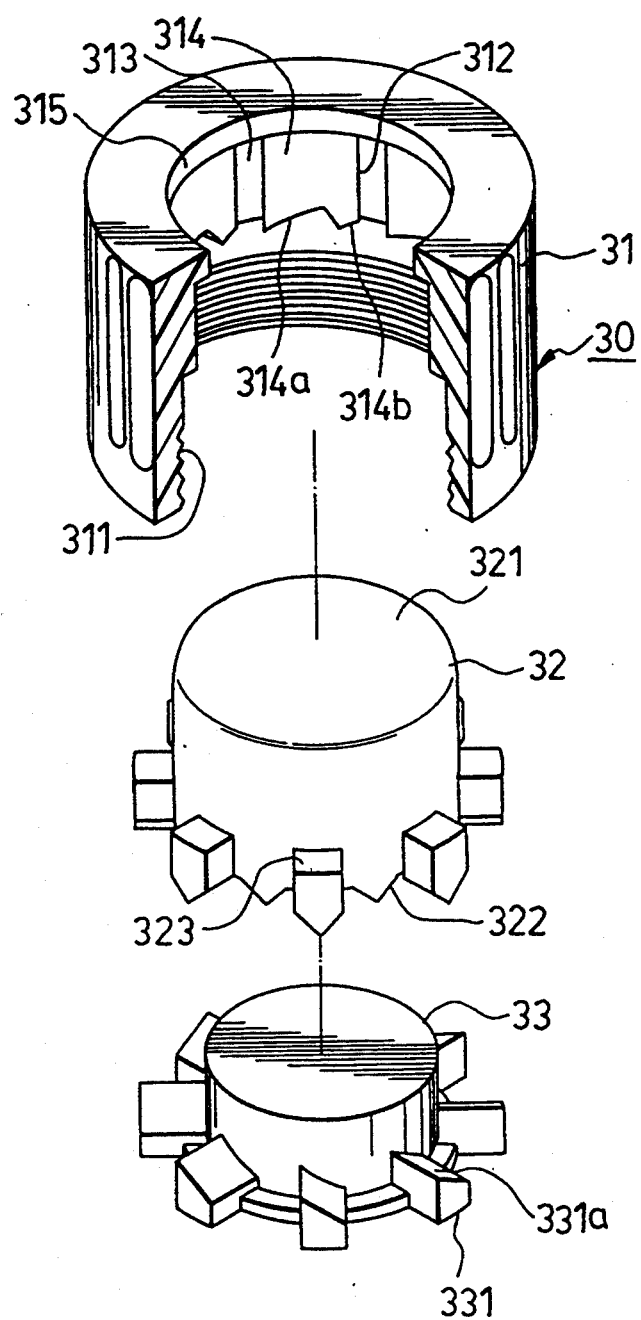
FIG. 2 is an exploded view of a control unit of the preferred embodiment.
Figure 3:
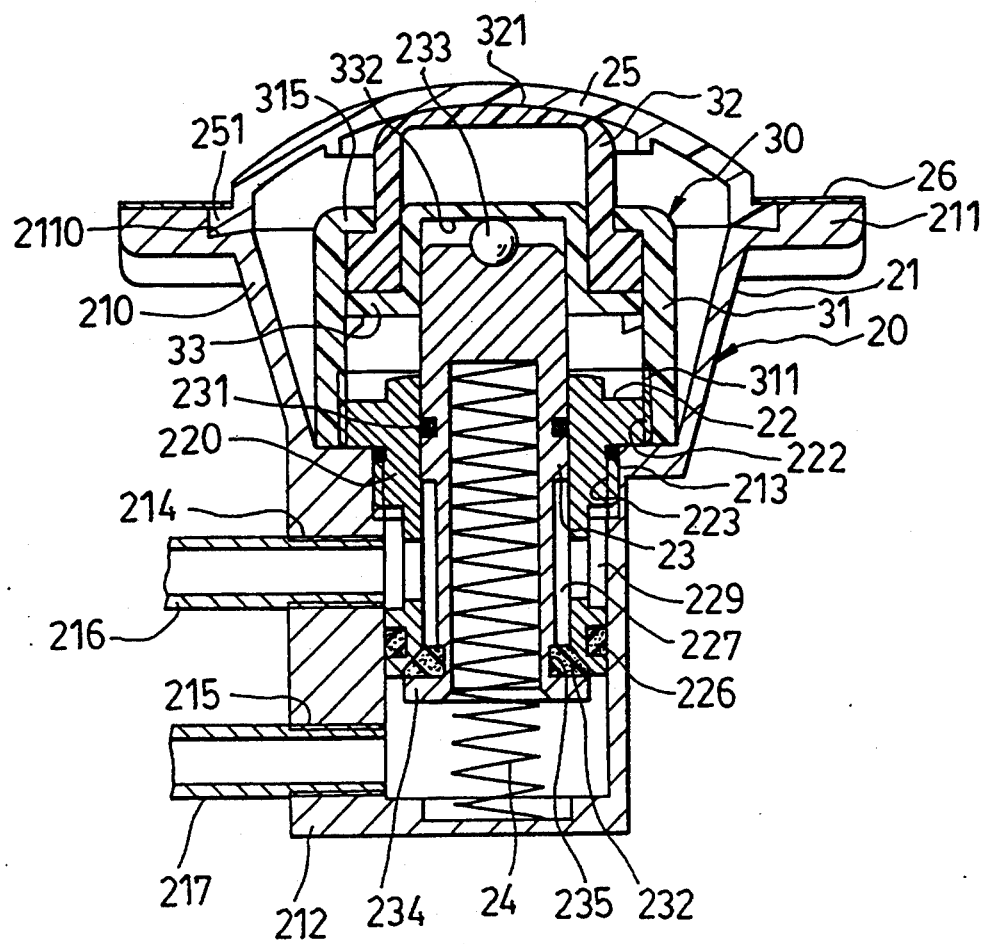
FIG. 3 is a sectional view which illustrates the preferred embodiment when in a closed state.

Referring to FIGS. 1 to 3, the preferred embodiment of a foot-operated valve according to the present invention is shown to comprise a valve set 20 and a control unit 30.

The valve set 20 includes a hollow seat 21, a tubular sleeve 22, a push rod 23, and a compression spring 24.

The hollow seat 21 has an upright tube portion 212, a hollow receiving portion 210 formed integrally on an open top of the tube portion 212, and a radial mounting flange 211 extending outwardly from a top end of the receiving portion 210. The open top of the tube portion 212 is formed with an internal thread 213. The tube portion 212 is further formed with a set of internally threaded water outlet and inlet holes 214, 215 to be connected to outlet and inlet pipe connectors 216, 217, respectively. In this embodiment, the water outlet hole 214 is aligned vertically with and is disposed above the water inlet hole 215.

The push rod 23 is a hollow rod with a closed top and an open bottom. A steel ball 233 is mounted on the closed top of the push rod 23. The push rod 23 has a surrounding wall provided with an O-ring 231, a radial outward flange 234 adjacent to the open bottom, and an annular peripheral groove 235 immediately above the outward flange 234. An annular plug 232, which is made of a resilient material, is retained around the open bottom of the push rod 23 at the peripheral groove 235 and is supported on the outward flange 234. The plug 232 has a tapered periphery.

The compression spring 24 is disposed in the push rod 23 and has a lower end which abuts the closed bottom of the tube portion 212 of the hollow seat 21.

The tubular sleeve 22 is formed as a cylindrical tube with an annular wider top portion 221, which extends into the receiving portion 210 of the hollow seat 21 and which is formed with an external thread 222 for engaging the control unit 30, and a narrower lower portion 220 which extends into the tube portion 212 of the hollow seat 21 and which is formed with an external thread 223 (see FIG. 3) for engaging the internal thread 213. The lower portion 220 of the tubular sleeve 22 is further formed with a passage means constituted by two radial water holes 224 to be aligned with the water outlet hole 214, and an annular peripheral groove 229 around the water holes 224. The water holes 224 and the peripheral groove 229 serve to communicate the axial throughhole 227 confined by the tubular sleeve 22 and the outlet pipe connector 216. An annular insert groove 225 is formed at an appropriate location of the lower portion 220 and has an O-ring 226 received fittingly therein. The through-hole 227 of the tubular sleeve 22 permits the push rod 23 to extend sealingly and slidably therethrough so as to enable the latter to reach the interior of the tube portion 212 of the hollow seat 21. The tubular sleeve 22 has a distal bottom end with an inclined inner peripheral surface 228 (see FIG. 5) which complements the tapered periphery of the plug 232.

A resilient cup 25 is provided on the mounting flange 211 of the hollow seat 20 and is formed as a hemispherical shell. Preferably, the resilient cup 25 has a peripheral flange 251 which is received in an annular groove 2110 that is formed on the top surface of the mounting flange 211.

A cover plate 26 is mounted on the mounting flange 211 and is formed with four locking holes 262 and an opening 261. Screws 263 (only one is shown) extend through the locking holes 262 and engage a respective screw hole 2111 on the mounting flange 211 to fasten the cover plate 26 on the hollow seat 21. The opening 261 is sized so as to permit the projection of the resilient cup 25 therethrough while enabling the cover plate 26 to press the flange 251 of the resilient cup 25 against the mounting flange 211.

Figure 4:
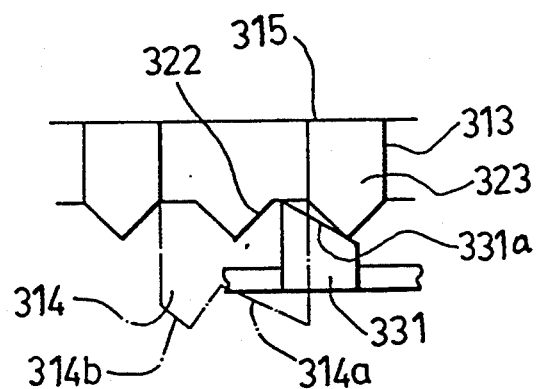
FIG. 4 is a schematic view illustrating a portion of the control unit when the preferred embodiment is in a closed state.

Referring to FIGS. 2 to 4, the control unit 30 is shown to comprise a button retaining seat 31, a button 32 and a rotary member 33.

The button retaining seat 31 is to be disposed within the receiving portion 210 of the hollow seat 21 and is formed as a ring-shaped member. The button retaining seat 31 has a lower portion formed with an internal thread 311 for engaging the external thread 222 on the top portion 221 of the tubular sleeve 22, and an upper portion with an inner wall surface which is formed with a retaining unit 312 that includes a plurality of angularly spaced rib sets 314. Every two adjacent rib sets 314 cooperatively define a guideway 313 therebetween. Each of the rib sets 314 includes first and second ribs 314a, 314b which are arranged side-by-side and which extend in an axial direction of the button retaining seat 31. The first and second ribs 314a, 314b have substantially equal lengths and inclined end surfaces which incline in the same direction. The upper portion of the button retaining seat 31 further has a distal end that is formed with an annular inward flange 315.

The button 32 is a hollow cylindrical member which extends movably in the button retaining seat 31 and which has a closed top end portion that is provided with a pressing surface 321 and that extends upwardly through the annular inward flange 315 to abut normally against the bottom surface of the resilient cup 25, and an open lower end portion that is formed with several downwardly extending teeth 322 and a plurality of radial outward first protrusions 323. Each of the first protrusions 323 is disposed between two adjacent teeth 322 and extends into a respective one of the guideways 313. The annular inward flange 315 limits the upward movement of the first protrusions 323 in the guideways 313.

The rotary member 33 is a hollow cylindrical member which extends movably into the open lower end portion of the button 32 and which has a closed top 332 and an open bottom that is formed with a plurality of radial outward second protrusions 331. Each of the second protrusions 331 has an inclined top face 331a which abuts normally with one of the first protrusions 323 and with the bottom edge of the button 32. The closed top of the push rod 23 extends into the open bottom of the rotary member 33 such that the steel ball 233 abuts the closed top 332 of the rotary member 33.

Figure 5:
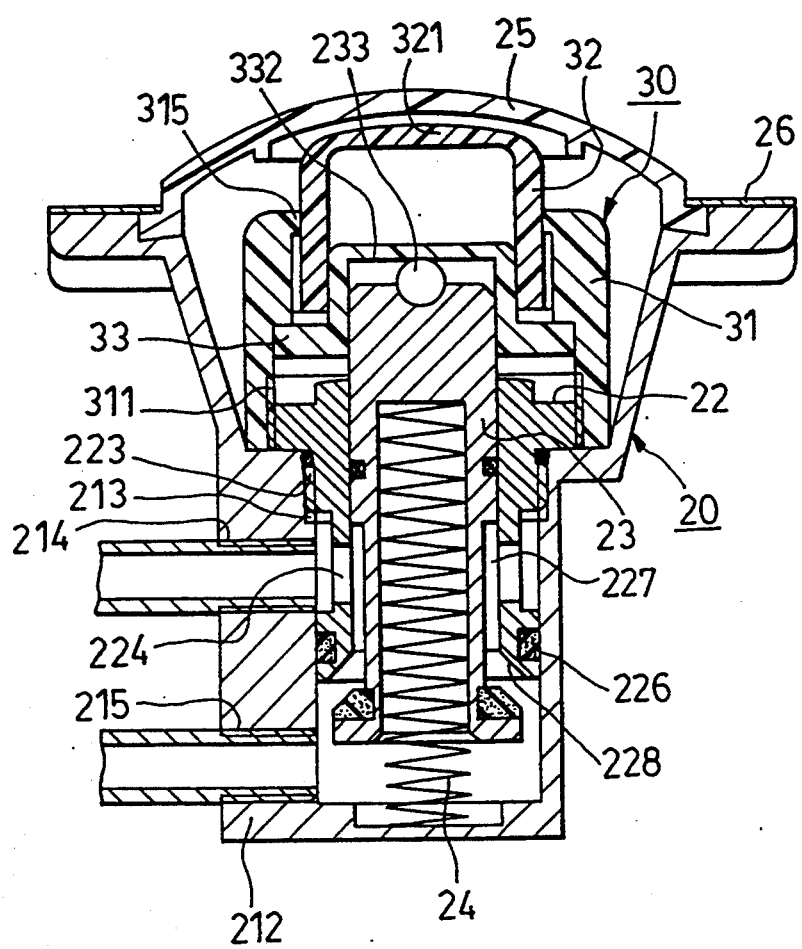
FIG. 5 is a sectional view which illustrates the preferred embodiment when in an open state.
Figure 6:
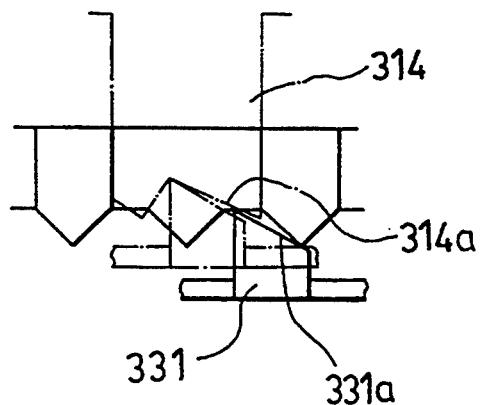
FIG. 6 is a schematic view which illustrates the operation of the control unit when the preferred embodiment is being opened.

Referring to FIGS. 5 and 6, when pressure is applied on the resilient cup 25, the button 32 moves downward relative to the button retaining seat 31 such that the first protrusions 323 of the button 32 push correspondingly the second protrusions 331 of the rotary member 33. The rotary member 33 consequently pushes the push rod 23 downward to compress the compression spring 24. Due to the provision of the inclined top face 331a, the second protrusions 331 eventually slide along the inclined end surface of a respective one of the first ribs 314a. At this stage, the compression spring 24 is retained in a compressed state, and the plug 232 ceases to abut the inclined surface 228 of the tubular sleeve 22, thereby permitting water entering the tube portion 212 of the hollow seat 21 via the water inlet hole 215 to flow continuously through the water outlet hole 214 via the through-hole 227 and the passage means of the tubular sleeve 22 without the need to apply pressure continuously on the resilient cup 25.

Figure 7:
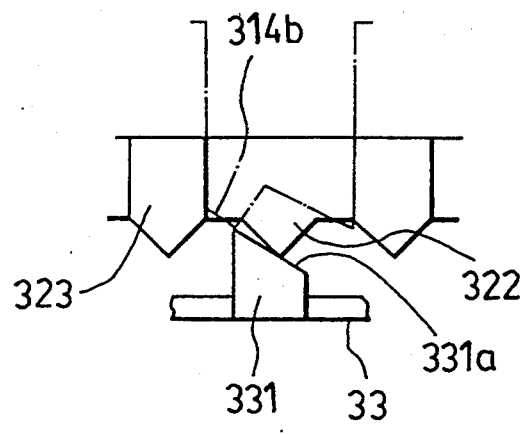
FIG. 7 is a schematic view which illustrates the operation of the control unit when the preferred embodiment is being closed.

Referring to FIG. 7, when pressure is once again applied on the resilient cup 25, the button 32 moves downward relative to the button retaining seat 31 such that the teeth 323 of the button 32 push correspondingly the second protrusions 331 of the rotary member 33. The second protrusions 331 eventually slide past the inclined end surface of a respective one of the second ribs 314b so as to abut once more with one of the first protrusions 323. At this stage, the compression spring 24 expands to bias the push rod 23 upwardly such that the plug 232 abuts tightly against the inclined surface 228 of the tubular sleeve 22, thereby cutting off water flow through the water outlet hole 214.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

We claim:
1. A foot-operated valve, comprising:
   a valve set including: a hollow seat having an upright tube portion with an open top and a closed bottom, said tube portion being formed with a set of water outlet and inlet holes, one of said water outlet and inlet holes being disposed at a level higher that the other one of said water outlet and inlet holes; a tubular sleeve secured to and extending into said tube portion, said tubular sleeve confining an axial through-hole and being formed with a passage means to communicate said through-hole and said water outlet hole; a push rod extending sealingly and slidably through said tubular sleeve, said push rod having a top end and a bottom end extending into said tube portion and having a plug secured therearound; and a compression spring provided in said tube portion and interposed between said closed bottom of said tube portion and said push rod to bias said push rod upwardly to a first position, wherein said plug closes normally a distal bottom end of said tubular sleeve to prevent water flowing through said water inlet hole from reaching said water outlet hole, said push rod being movable to a second position, wherein said plug is spaced from said distal bottom end of said tubular sleeve to permit water from said water inlet hole to flow through said water outlet hole; and
   a control unit including: a button retaining seat secured to said hollow seat above said tube portion, said button retaining seat being formed as a ring-shaped member and having an inner wall surface which is formed with a retaining unit, said retaining unit including a plurality of angularly spaced rib sets, every two adjacent said rib sets cooperatively defining a guideway therebetween, each of said rib sets including first and second ribs which are arranged side-by-side and which extend in an axial direction of said button retaining seat, said first and second ribs having substantially equal lengths and inclined end surfaces which incline in the same direction; a button formed as a hollow cylindrical member which extends movably in said button retaining seat and which has a closed top end portion that extends upwardly through said button retaining seat and an open lower end portion that is formed with a plurality of downwardly extending teeth and a plurality of radial outward first protrusions, each of said first protrusions being disposed between two adjacent ones of said teeth and extending into a respective one of said guideways; and a rotary member formed as a hollow cylindrical member which extends movably into said open lower end portion of said button and which has a closed top and an open bottom that is formed with a plurality of radial outward second protrusions, said top end of said push rod extending into said open bottom of said rotary member;

each of said second protrusions abutting one of said first protrusions when said push rod is in said first position, application of pressure on said button to move said push rod from said first position to said second position causing said rotary member and said push rod to move downwardly to cause said second protrusions of said rotary member to slide eventually along said inclined end surface of a respective one of said first ribs to retain said push rod in said second position, application of pressure on said button to move said push rod from said second position to said first position causing said teeth of said button to push said second protrusions to enable said second protrusions to slide eventually past said inclined end surface of a respective one of said second ribs so as to abut once more with one of said first protrusions and permit said push rod to return to said first position.

2. The foot-operated valve as claimed in claim 1, wherein:
   said hollow seat has a hollow receiving portion formed integrally on said open top of said upright tube portion;
   said tubular sleeve has a top portion which extends into said receiving portion of said hollow seat; and
   said control unit is disposed in said receiving portion, and said button retaining seat has a lower portion connected to said top portion of said tubular seat.

3. The foot-operated valve as claimed in claim 2, wherein said hollow seat further has a radial mounting flange which extends outwardly from a top end of said receiving portion, said valve set further comprising a resilient cup secured on said mounting flange and formed as a hemispherical shell.

4. The foot-operated valve as claimed in claim 3, wherein said resilient cup has a peripheral flange, said valve set further comprising a cover plate mounted on said mounting flange and formed with an opening which is sized so as to permit projection of said resilient cup therethrough while enabling said cover plate to press said peripheral flange of said resilient cup against said mounting flange.

5. The foot-operated valve as claimed in claim 4, wherein said mounting flange has a top surface formed with an annular groove for receiving said peripheral flange of said resilient cup.

6. The foot-operated valve as claimed in claim 1, wherein said top end of said push rod is provided with a steel ball which is in contact with said closed top of said rotary member.

* * * * *